L. W. BATES.
METHOD OF AND APPARATUS FOR RECORDING SOUNDS.
APPLICATION FILED OCT. 1, 1917.
1,294,861.
Patented Feb. 18, 1919.
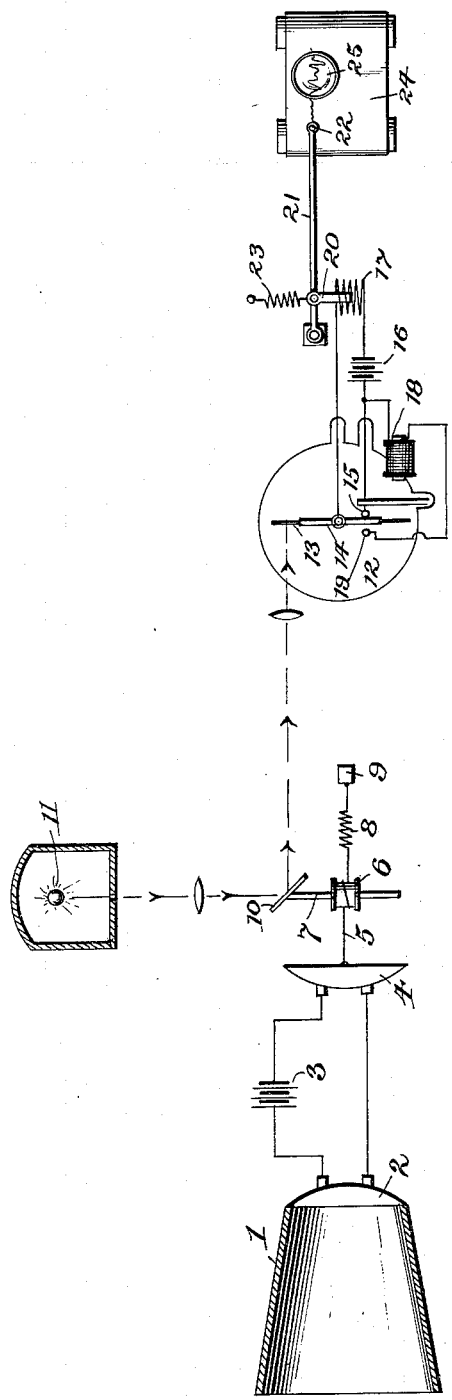

UNITED STATES PATENT OFFICE.

LINDON W. BATES, OF NEW YORK, N. Y.

METHOD OF AND APPARATUS FOR RECORDING SOUNDS.

1,294,861.     Specification of Letters Patent.     Patented Feb. 18, 1919.

Application filed October 1, 1917. Serial No. 194,226.

*To all whom it may concern:*

Be it known that I, LINDON W. BATES, a citizen of the United States, residing at New York, in the county of New York and State of New York, have invented certain new and useful Improvements in Methods of and Apparatus for Recording Sounds, of which the following is a specification.

This invention pertains to the recording of the time of receipt and intensity of sound waves in a receiver. It may be utilized in connection with the detection and location of submarines and other vessels or objects at sea from an observing vessel or object. It may be utilized with the method of detecting at an observing station upon a vessel or object at sea the sounds emanating from a submarine itself, or from a torpedo launched from a submarine, or again to detect echoes of sounds having their source at the observing vessel or object, which are reflected back from the submarine or other vessel or object to be located.

Difficulties have been encountered in the recording of slight sounds. Microphones and other receivers receive the sound waves, but their oscillations are frequently so slight as to prevent a record being taken of the time of receipt of the waves and of their intensity. The time and intensity factors are of importance, for example, to determine the distance from an observing vessel or object of a submarine or other vessel or object from which sounds emanate or are reflected.

It is proposed to use the oscillations produced in a receiver by the sound waves to produce oscillations of light waves, which in turn break an electrical circuit. The time of breaking of the circuit is to be recorded and also the duration of the break. As the several operations are practically instantaneous, the time of breaking may be taken as the time for receipt of the sound in the detector. If the operations are not sufficiently rapid a time allowance may be made.

In carrying my invention into effect, it is desirable to employ, so far as practicable, apparatus whose general characteristics are known. An illustrative embodiment is shown in the accompanying drawing or diagram, but this is merely one of many possible embodiments thereof, and it is to be understood as intended primarily for purposes of explanation of the principles involved, without attempting to show the several parts or elements in actual scale or in the precise form they will or may assume in practical service.

In this drawing, 1 indicates a horn or megaphone of suitable dimensions for collecting sound waves and directing them to the diaphragm of a microphone 2; which may conveniently be of the granular carbon type. The microphone 2, is included in the circuit of an electric generator or battery 3, which circuit also includes a magneto-electric receiver 4 of any approved type.

Attached to and proceeding from the diaphragm of the receiver 4 is a thread of silk or a fine and very flexible wire 5, which passes about a drum or pulley 6, carried by a spindle or arbor 7, having pivots seated in bearings of agate or the like, so as to turn with a minimum of friction and in response to minute force. After encircling the drum or pulley 6, the thread or wire 5 is attached to one end of a delicate spring 8, here shown as of helical form, the other end of the spring being made fast to a fixed support or anchor 9.

Under this arrangement, vibrations imparted to the diaphragm of the microphone will cause varying compression of the granules of carbon in said microphone, thereby setting up in the circuit in which are included the microphone and receiver, electrical waves or pulsations, which will in turn throw into vibration the diaphragm of the receiver 4. The outward swing of the diaphragm, by slackening the thread or wire 5, permits the spring 8 to draw the thread or wire longitudinally a corresponding distance, and in doing so to turn the drum or pulley 6 and the spindle or arbor 7 to which it is made fast.

A mirror, indicated by 10, is carried by the spindle or arbor, and is fixed thereon at an angle to the longitudinal axis of the spindle, an angle of 45° to the horizon being here indicated. The mirror 10 is so set and the receiver diaphragm, spindle, spring and anchor so adjusted that when all are at rest, a beam of light falling upon the mirror 10 from a properly positioned and fixed source of light 11, will be thrown to one side of or just off the blackened or absorbing face 13 of the movable member 14 of a radiometer 12, the said member being here represented in the form of a lever, delicately pivoted at a point between its ends. Rotation of the spindle beyond a predetermined point will cause the beam to be thrown upon the surface 13, which will instantly recede in consequence of the impelling effect of the strong light ray or beam.

The body of lever 14 carries or constitutes a circuit closing contact which rests against a contact block 15 of a circuit in which are included a battery 16 or source of current, and a solenoid coil 17, the circuit being closed when the parts are at rest.

An electro-magnet indicated by 18, a pole of which is located in attracting proximity to the lever 14 of the radiometer, is placed so that the said magnet is in an open branch, derived from the main circuit of battery 16, and is hence normally deënergized.

On the side of the lever 14 opposite that on which is located the contact 15, is a similar contact block 19, forming a terminal of the branch circuit in which electro-magnet 18 is placed. It will be seen that by reason of this arrangement of parts, the lever 14, when moved away from contact 15 and thereby opening the main circuit, will immediately complete the branch circuit by reason of moving to contact block 19. As a consequence of this, the magnet 18 is energized and attracts lever 14, thereby breaking its own branch circuit, but only after it has exerted a pulling force upon the lever 14, and given to it an impulse sufficient to insure its movement to contact 15, and the closing of the main circuit.

The contact blocks 15 and 19 constitute stops which limit the play of lever 14, under the arrangement here shown, the parts being so positioned that the lever tends naturally or mechanically to rest against contact 15 and to close the main circuit.

Within the solenoid coil 17 is arranged a soft iron core 20 carried by a lever 21, fulcrumed at one end, and carrying at the opposite end a stylus or marker 22, said core being drawn into the coil and there held so long as the circuit in which the coil is included remains closed. The suction of the coil is opposed by a spring 23, which is nicely adjusted with reference to the pull of the coil to maintain the stylus or marker normally in given position, and to move it in a direction opposite to that in which it is normally held by the suction of solenoid coil 17, whenever the circuit of said coil is opened or broken.

In the diagrammatic illustration here given, the source of light 11 is conveniently represented as an electric arc, contained within a casing having a small orifice through which a beam of light is directed to the mirror 10. A suitable reflector behind the light, and lenses interposed between the light and mirror, and between the mirror and the radiometer, as indicated, may be provided to intensify the effect of the light ray.

The stylus or marker 22 overlies and bears lightly upon a record sheet or surface 24 which may be suitably divided, and which is caused to advance at predetermined and constant speed. So long as the marker remains at rest it will trace a straight line upon the record sheet or surface, but any movement of the lever 21 about its pivot, incident to deënergization of coil 17 and pull of spring 23 on the one hand, and to succeeding energization and pull of the magnet, on the other hand, will cause the marker by its deflections to trace a curved zig-zag line. The time of receipt of the sound waves will be observed from the time of beginning of the deflections. The deflections will be of amplitude proportionate to the exceedingly brief but varying periods of time during which the circuit is interrupted. These periods will in turn vary in proportion to the intensity of the sound waves, and the consequent amplitude of movement of microphone and receiver diaphragms, and of mirror 10. Similarly, the length of each deflection of the line traced, measured in the direction of travel of the record sheet or surface, will be governed by the same factors.

As the movements of the marker will in any event be slight, a magnifying lens or a microscope 25 may be provided to facilitate the reading of the record made.

It may be essential under certain conditions to locate certain parts of the apparatus used where vibration will be precluded, as otherwise, owing to the exceeding delicacy of construction and adjustment essential to recording of the sound waves, the instruments employed would produce false records or fail to function. It may hence be necessary to float the base or support of the apparatus upon a body of mercury or other dense but mobile liquid, or to carry it upon a gimbal frame, or to combine the two plans. The present application is directed rather to the general plan and instrumentalities than to specific details of apparatus employed.

It is obvious that instead of having the stylus or marker swing laterally and produce a zig-zag or curved line it may be normally held in marking contact with the record sheet or surface and released by backward movement of the radiometer element or circuit breaker. Such arrangement would cause a line to be traced until the main circuit was broken, at which instant the stylus would be moved clear of the record sheet or surface and a break, or unmarked space would appear, the length of which would be proportionate to the time during which the circuit breaker remained in circuit opening position. The commencement of the break in the line would mark the instant of arrival in the receiver of the sound waves of the minimum amplitude to be recorded. The interval in the line would indicate the duration of the break. By delicately adjusting the strength of magnet to exert an attraction very slightly less than the repelling power of the light beam falling on the radiometer element, this interval might also be made to record the intensity of the waves received, and thus afford a double basis of calculation of the distance traveled by the recorded sound waves.

Mere reversal of the action of the stylus, so that it will normally be out of marking relation to the record sheet or surface but be brought into such relation on recession of the radiometer element, would involve no change in principle or effect. The same is true as to the light ray; that is to say it may be arranged to be thrown to the radiometer normally and be deflected on arrival of waves of given intensity, or the reverse. The result would be the same, except that marking would occur only when the waves of predetermined amplitude arrived in the receiver.

It will be seen from the foregoing description that the horn or megaphone, microphonic receiver, mirror, and operating connections therefor, together with the light projector, constitute a species of phonodeik, which with the aid of the radiometer, makes possible translation of very feeble sound waves, into larger light waves, which latter can be practically recorded and measured on a scale sufficient for the purposes indicated, whereas the sound waves themselves cannot be directly so recorded, measured and utilized.

The invention hence contemplates broadly this combination of sound wave receiver, phonodeik, radiometer, and timed recording mechanism controlled by the radiometer. The specific details of these several parts may be considerably varied.

The making of a graphic record of the sound waves showing their amplitude or intensity, and showing also the time and duration thereof, is the leading object of this invention. The method involves the making of such a record, and the apparatus includes as a necessary element, means for producing such graphic or visible and permanent time record of sounds received from a distance by the sound-responsive element.

Having thus described the invention, what I claim is:—

1. A method of recording the time of receipt of sound waves in a receiver, which consists in utilizing the oscillations produced in the receiver by the sound waves to produce corresponding oscillations in light waves, which in turn break an electrical circuit, the time of which occurrence is recorded.

2. A method of recording the intensity of sound waves received in a receiver, which consists in utilizing the oscillations produced in the receiver by sound waves to produce corresponding oscillations in light waves, which in turn break an electrical circuit which is remade upon termination of the light oscillations, the duration of which break is recorded.

3. A method of recording the time of arrival of sound waves in a receiver, which consists in causing the oscillations produced therein by said waves to position a mirror and thus to direct a beam of light to a radiometric element which controls and brings into action a time recording device.

4. In a method of recording the time of arrival of sound waves in a receiver, the step, which consists in translating the sound waves into light waves.

5. The steps in the process of recording the time of arrival of sound waves in a receiver, which consist in translating the sound waves into light waves, and simultaneously projecting the light waves to and imposing them upon a radiometric element controlling a time recording device.

6. A method of recording the time of arrival of sound waves in a receiver, which consists in utilizing the oscillations produced by the entering sound waves to direct a beam of light relatively to a radiometric element, and thereby to cause said element to move, and to control an electric circuit, and thus to bring instantly into operation a recording device.

7. A method of recording the time of receipt of sound waves in a receiver, which consists in causing the oscillations produced in the receiver by the sound waves to produce oscillations in light waves, which in turn actuate the control element of a time recorder.

8. A method of recording the time of arrival and intensity of sound waves in a receiver, which consists in utilizing the oscillations produced by the entering waves to direct a beam of light relatively to the energy absorbing face of a radiometric circuit breaker controlling the commencement and period of operation of a time recorder.

9. Apparatus for detecting and recording arrival of sound waves, comprising a sound wave receiver or megaphone, a microphonic receiver to which the waves are delivered and by which they are reproduced; a mirror connected with and moved by the diaphragm of said receiver; a source of light arranged to deliver a beam of light upon said mirror; a circuit breaker having an energy absorbing face in position to receive the light rays from the mirror when the latter is moved from normal position; a recording surface; means for moving said surface at a predetermined and constant speed; and a marker coacting with the recording surface and controlled as to its position by said circuit breaker.

10. In apparatus for recording the arrival of sound waves and their duration, the combination of a microphonic receiver; a phonodeik mechanically connected with and controlled by such receiver; a time recorder; and a radiometric circuit controller adapted to be actuated by the beam of light from the phonodeik, and serving to control the commencement and duration of the recording operation in consonance with the arrival and duration of the sound waves in the receiver.

In testimony whereof I have signed my name to this specification.

LINDON W. BATES.